United States Patent
Budde et al.

(10) Patent No.: US 12,301,052 B2
(45) Date of Patent: *May 13, 2025

(54) REVERSED POWER AND GRID SUPPORT WITH A MODULAR APPROACH

(71) Applicant: SCHNEIDER ELECTRIC IT CORPORATION, Foxboro, MA (US)

(72) Inventors: Kristian Budde, Kolding (DK); Flemming Johansen, Kolding (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,793

(22) Filed: Dec. 13, 2023

(65) Prior Publication Data

US 2024/0113553 A1    Apr. 4, 2024

Related U.S. Application Data

(63) Continuation of application No. 17/660,702, filed on Apr. 26, 2022, now Pat. No. 11,888,344.

(51) Int. Cl.
*H02J 9/06* (2006.01)

(52) U.S. Cl.
CPC .................. *H02J 9/062* (2013.01)

(58) Field of Classification Search
CPC ..................................... H02J 9/062
USPC ......................................... 307/23
See application file for complete search history.

(56) References Cited

U.S. PATENT DOCUMENTS

| | | | |
|---|---|---|---|
| 10,826,322 B2 | 11/2020 | Colombi et al. | |
| 11,075,540 B2 | 7/2021 | Shigeta | |
| 11,196,293 B2 | 12/2021 | Uda et al. | |
| 11,888,344 B2 * | 1/2024 | Budde | H02J 9/062 |
| 2011/0043160 A1 | 2/2011 | Serban | |
| 2015/0130277 A1 | 5/2015 | Ballantine et al. | |
| 2018/0269819 A1 | 9/2018 | Tuckey et al. | |
| 2019/0280520 A1 | 9/2019 | Zhang | |

FOREIGN PATENT DOCUMENTS

| | | |
|---|---|---|
| CN | 1930754 A | 3/2007 |
| EP | 2636122 B1 | 8/2019 |
| JP | 5784520 B2 | 9/2015 |

OTHER PUBLICATIONS

Extended European Search Report from corresponding European Application No. 23160004.0 dated Sep. 25, 2023.

* cited by examiner

*Primary Examiner* — Richard Tan
(74) *Attorney, Agent, or Firm* — Lando & Anastasi, LLP

(57) ABSTRACT

Aspects of the disclosure include a power supply system is provided comprising first and second inputs, an output, a first group of power modules coupled to the inputs and the output, a second group of power modules coupled to the inputs, and at least one controller configured to control, in a reverse mode, the first group of power modules to provide power derived from the second input to the output, wherein a majority of power provided by each power module of the first group of power modules in the reverse mode is provided to the output, and control, in the reverse mode, the second group of power modules to provide power derived from the second input to the first input, wherein a majority of power provided by each power module of the second group of power modules in the reverse mode is provided to the first input.

20 Claims, 7 Drawing Sheets

REVERSED POWER AND GRID SUPPORT WITH A MODULAR APPROACH

CROSS-REFERENCE TO RELATED APPLICATION

This application is a continuation of U.S. application Ser. No. 17/660,702, titled REVERSED POWER AND GRID SUPPORT WITH A MODULAR APPROACH, filed on Apr. 26, 2022, which is hereby incorporated by reference in its entirety.

BACKGROUND

1. Field of the Disclosure

At least one example in accordance with the present disclosure relates generally to uninterruptible power supplies.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a UPS is provided, the UPS comprising a first input configured to be coupled to a main-power source; a second input configured to be coupled to a backup-power source; an output configured to be coupled to at least one load; a first group of one or more power modules coupled to the first input, the second input, and the output; a second group of one or more power modules coupled to the first input and the second input; and at least one controller configured to control, in a reverse mode of operation, the first group of one or more power modules to provide power derived from the second input to the output, wherein a majority of power provided by each power module of the first group of one or more power modules in the reverse mode of operation is provided to the output, control, in the reverse mode of operation, the second group of one or more power modules to provide power derived from the second input to the first input, wherein a majority of power provided by each power module of the second group of one or more power modules in the reverse mode of operation is provided to the first input, control, in a forward mode of operation, the first group of one or more power modules to provide power derived from the first input to the output and to provide power derived from the first input to the second input, wherein a majority of power provided by the first group of one or more power modules in the forward mode of operation is provided to the output and second input, and control, in the forward mode of operation, the second group of one or more power modules to provide power derived from the first input to the second input, wherein a majority of power provided by the second group of one or more power modules in the forward mode of operation is provided to the second input.

In some examples, the at least one controller is further configured to receive, from a grid controller coupled to the main-power source, a request for power, and control, responsive to receiving the request for power, the UPS system to operate in the reverse mode of operation. In some examples, the at least one controller is further configured to control, in a regenerative mode of operation, the first group of one or more power modules to provide power derived from the output to the second input. In some examples, the at least one controller is further configured to control, in the regenerative mode of operation, the second group of one or more power modules to provide power derived from the second input to the first input. In some examples, the at least one controller is further configured to control the second group of one or more power modules to provide a current-controlled power output to the first input. In some examples, the at least one controller is further configured to provide one or more pulse-width-modulation signals to the second group of one or more power modules to provide the current-controlled power output to the first input. In some examples, the at least one controller is further configured to control the first group of one or more power modules to provide a voltage-controlled power output to the output. In some examples, the majority of the power provided by each power module of the first group of one or more power modules in the forward mode of operation is at least ninety percent of the power provided by each power module of the first group of one or more power modules in the forward mode of operation, and wherein the majority of power provided by each power module of the second group of one or more power modules in the forward mode of operation is at least ninety percent of the power provided by each power module of the second group of one or more power modules in the forward mode of operation.

According to at least one aspect of the present disclosure, a non-transitory computer-readable medium is provided, the medium storing thereon sequences of computer-executable instructions for controlling an uninterruptible power supply system having a first input configured to be coupled to a main-power source, a second input configured to be coupled to a backup-power source, an output configured to be coupled to at least one load, a first group of one or more power modules coupled to the first input, the second input, and the output, and a second group of one or more power modules coupled to the first input and the second input, the sequences of computer-executable instructions including instructions that instruct at least one processor to: control, in a reverse mode of operation, the first group of one or more power modules to provide power derived from the second input to the output, wherein a majority of the power provided by each power module of the first group of one or more power modules in the reverse mode of operation is provided to the output, control, in the reverse mode of operation, the second group of one or more power modules to provide power derived from the second input to the first input, wherein a majority of the power provided by each power module of the second group of one or more power modules in the reverse mode of operation is provided to the first input, control, in a forward mode of operation, the first group of one or more power modules to provide power derived from the first input to the output and the second input, wherein a majority of the power provided by each power module of the first group of one or more power modules in the forward mode of operation is provided to the output and the second input, and control, in the forward mode of operation, the second group of one or more power modules to provide power derived from the first input to the second input, wherein a majority of the power provided by each power module of the second group of one or more power modules in the forward mode of operation is provided to the second input.

In some examples, the instructions further instruct the at least one processor to receive, from a grid controller coupled to the main-power source, a request for power; and control, responsive to receiving the request for power, the uninterruptible power supply system to operate in the reverse mode of operation. In some examples, the instructions further instruct the at least one processor to control, in a regenerative mode of operation, the first group of one or more power modules to provide power derived from the output to the second input. In some examples, the instructions further instruct the at least one processor to control, in the regenerative mode of operation, the second group of one or more power modules to provide power derived from the second input to the first input. In some examples, the instructions further instruct the at least one processor to control the first group of one or more power modules to provide a voltage-controlled power output to the output. In some examples, the instructions further instruct the at least one processor to control the second group of one or more power modules to provide a current-controlled power output to the first input. In some examples, the instructions further instruct the at least one processor to provide one or more pulse-width-modulation signals to the second group of one or more power modules to provide the current-controlled power output to the first input. In some examples, the majority of the power provided by each power module of the first group of one or more power modules in the forward mode of operation is at least ninety percent of the power provided by each power module of the first group of one or more power modules in the forward mode of operation, and wherein the majority of power provided by each power module of the second group of one or more power modules in the forward mode of operation is at least ninety percent of the power provided by each power module of the second group of one or more power modules in the forward mode of operation.

According to at least one aspect of the present disclosure, a method for controlling an uninterruptible power supply system is presented, the UPS having a first input configured to be coupled to a main-power source, a second input configured to be coupled to a backup-power source, an output configured to be coupled to at least one load, a first group of one or more power modules coupled to the first input, the second input, and the output, and a second group of one or more power modules coupled to the first input and the second input, the method comprising: controlling, in a forward mode of operation, the first group of one or more power modules to provide power derived from the first input to the output and the second input, wherein a majority of the power provided by each power module of the first group of one or more power modules in the forward mode of operation is provided to the output and the second input; controlling, in the forward mode of operation, the second group of one or more power modules to provide power derived from the first input to the second input, wherein a majority of the power provided by each power module of the second group of one or more power modules in the forward mode of operation is provided to the second input; controlling, in a reverse mode of operation, the first group of one or more power modules to provide power derived from the second input to the output, wherein a majority of the power provided by each power module of the first group of one or more power modules in the reverse mode of operation is provided to the output; and controlling, in the reverse mode of operation, the second group of one or more power modules to provide power derived from the second input to the first input, wherein a majority of the power provided by each power module of the second group of one or more power modules in the reverse mode of operation is provided to the first input.

In some examples, the method further comprises receiving, from a grid controller coupled to the main-power source, a request for power; and controlling, responsive to receiving the request for power, the uninterruptible power supply system to operate in the reverse mode of operation. In some examples, the method further comprises: controlling, in a regenerative mode of operation, the first group of one or more power modules to provide power derived from the output to the second input. In some examples, in the regenerative mode of operation, the second group of one or more power modules to provide power derived from the second input to the first input.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
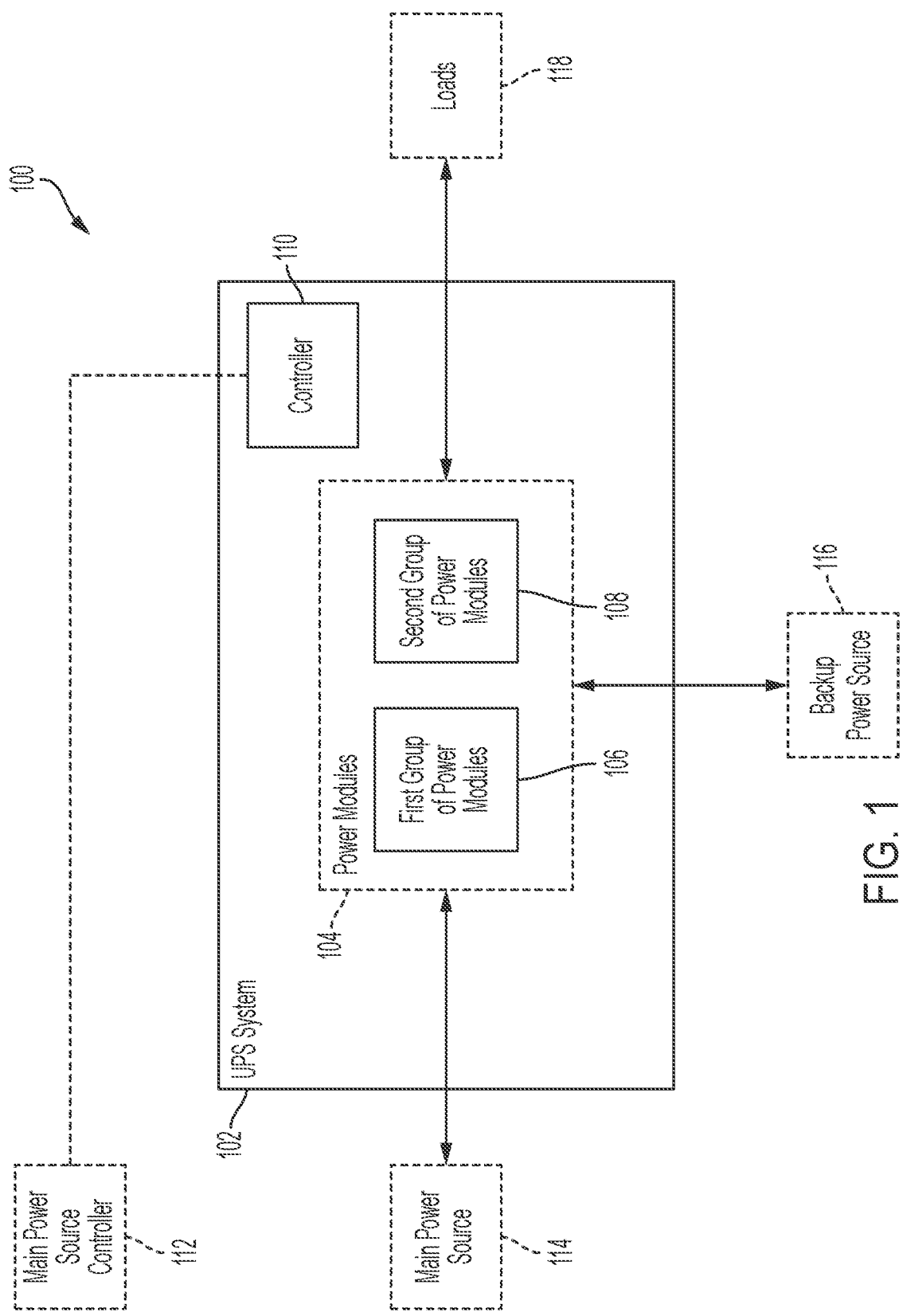
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Uninterruptible power supplies (UPSs) may be configured to provide uninterrupted power to one or more loads. UPSs may be coupled to a main-power source and a backup-power source, such as a battery, and provide power derived from the main-power source and/or the backup-power source to the one or more loads. For example, a UPS may provide load power derived from the main-power source when main power is available, and may provide load power derived from the backup-power source when main power is not available.

A main-power source may include an electrical-power grid. Electrical-power grids may include centralized utility mains grids, decentralized grids including renewable-energy sources, and so forth. In some examples, it may be advantageous for a UPS to provide power back to the electrical-power grid ("backfeed") in addition to drawing power from the grid. For example, it may be advantageous to backfeed power to the electrical-power grid to facilitate stabilization of the electrical-power grid.

Examples described herein include a UPS coupled to a main-power source, a backup-power source, and at least one load. The UPS may include a plurality of power modules. The plurality of power modules may include a first group of power modules and a second group of power modules. The first group of power modules may be coupled in a first configuration, and the second group of power modules may be coupled in a second configuration. In the first configuration, each power module of the first group of power modules is connected to the at least one load at a respective module-output connection. In the second configuration, each power module of the second group of power modules is connected to the main-power source at a respective module-output connection. In various examples, the first group of power modules may otherwise be substantially similar or identical to the second group of power modules. Examples of the disclosure may therefore provide cost-effective, standardized power modules capable of outputting power in various configurations.

FIG. 1 illustrates a block diagram of a power system 100 according to an example. The power system 100 includes a UPS system 102. The UPS system 102 includes a plurality of power modules 104 divided into at least two groups, a first group of power modules 106 and a second group of power modules 108. Each of the first group of power modules 106 and the second group of power modules 108 includes one or more power modules 200, as discussed in greater detail below with respect to FIG. 2. The UPS system 102 also include one or more system controllers 110 ("system controller 110") which may be communicatively coupled to one or more main power source controllers 112 ("grid controller 112"). The UPS system 102 may be further coupled to a main power source 114 ("grid 114"), a backup power source 116, and one or more loads 118 ("loads 118").

The UPS system 102 is configured to be coupled to the grid 114, the backup power source 116, and the loads 118, and may be communicatively coupled to the grid controller 112. The first group of power modules 106 is configured to be coupled to the grid 114, the backup power source 116, and the loads 118, and may be communicatively coupled to the system controller 110. The second group of power modules 108 is configured to be coupled to the grid 114 and the backup power source 116, and may be communicatively coupled to the system controller 110. The system controller 110 may be communicatively coupled to the first group of power modules 106, the second group of power modules 108, and the grid controller 112.

The grid 114 is coupled to the UPS system 102 and may include or be coupled to any of various types of power sources including, for example, generators, hydroelectric power sources, photovoltaic converters, wind turbines, and so forth. The UPS system 102 is configured to provide power to and/or receive power from the grid 114. For example, the UPS system 102 may backfeed power to the grid 114 to stabilize power on the grid 114.

The backup power source 116 may include one or more energy-storage devices, such as batteries, capacitors, flywheels, and so forth. In at least one example, the backup power source 116 may include a rechargeable battery. The UPS system 102 is configured to provide power to and/or receive power from the backup power source 116. In some examples, the UPS system 102 is configured to provide DC power to and/or receive DC power from the backup power source 116.

The loads 118 may include one or more devices configured to draw power provided from the UPS system 102. In various examples, the UPS system 102 may be configured to receive regenerative power from the loads 118 in addition to providing output load power to the loads 118.

As discussed in greater detail below, the UPS system 102 is configured to operate in any of at least three distinct modes of operation including a reverse mode of operation, a forward mode of operation, and a regenerative mode of operation. The system controller 110 selects and/or controls the mode of operation of the UPS system 102. For example, the system controller 110 may select and/or control the mode of operation of the UPS system 102 based on a status of the grid 114 or power received therefrom, a status of the backup power source 116 or power received therefrom, an operating mode of the loads 118, and so forth. In some examples, the system controller 110 may receive information and/or commands from the grid controller 112 indicative of a desired mode of operation between the forward mode of operation, the reverse mode of operation, and the regenerative mode of operation. In some examples, the UPS system 102 may operate in additional or different modes of operation as well.

In the reverse mode of operation, the UPS system 102 is configured to control the first group of power modules 106 to provide power derived from the backup power source 116 to the loads 118, and control the second group of power modules 108 to provide power derived from the backup power source 116 to the grid 114. Examples of the reverse mode of operation are discussed below with respect to FIG. 5.

In the regenerative mode of operation, the UPS system 102 controls the first group of power modules 106 to provide power derived from the loads 118 to the backup power source 116, and controls the second group of power modules 108 to provide power derived from the backup power source 116 to the grid 114. Examples of the regenerative mode of operation are discussed below with respect to FIG. 6.

In the forward mode of operation, the UPS system 102 is configured to control the first group of power modules 106 to provide power derived from the grid 114 to the loads 118 and to the backup power source 116, and controls the second group of power modules 108 to provide power derived from the grid 114 to the backup power source 116. Examples of the forward mode of operation are discussed below with respect to FIG. 7.

Figure 2:
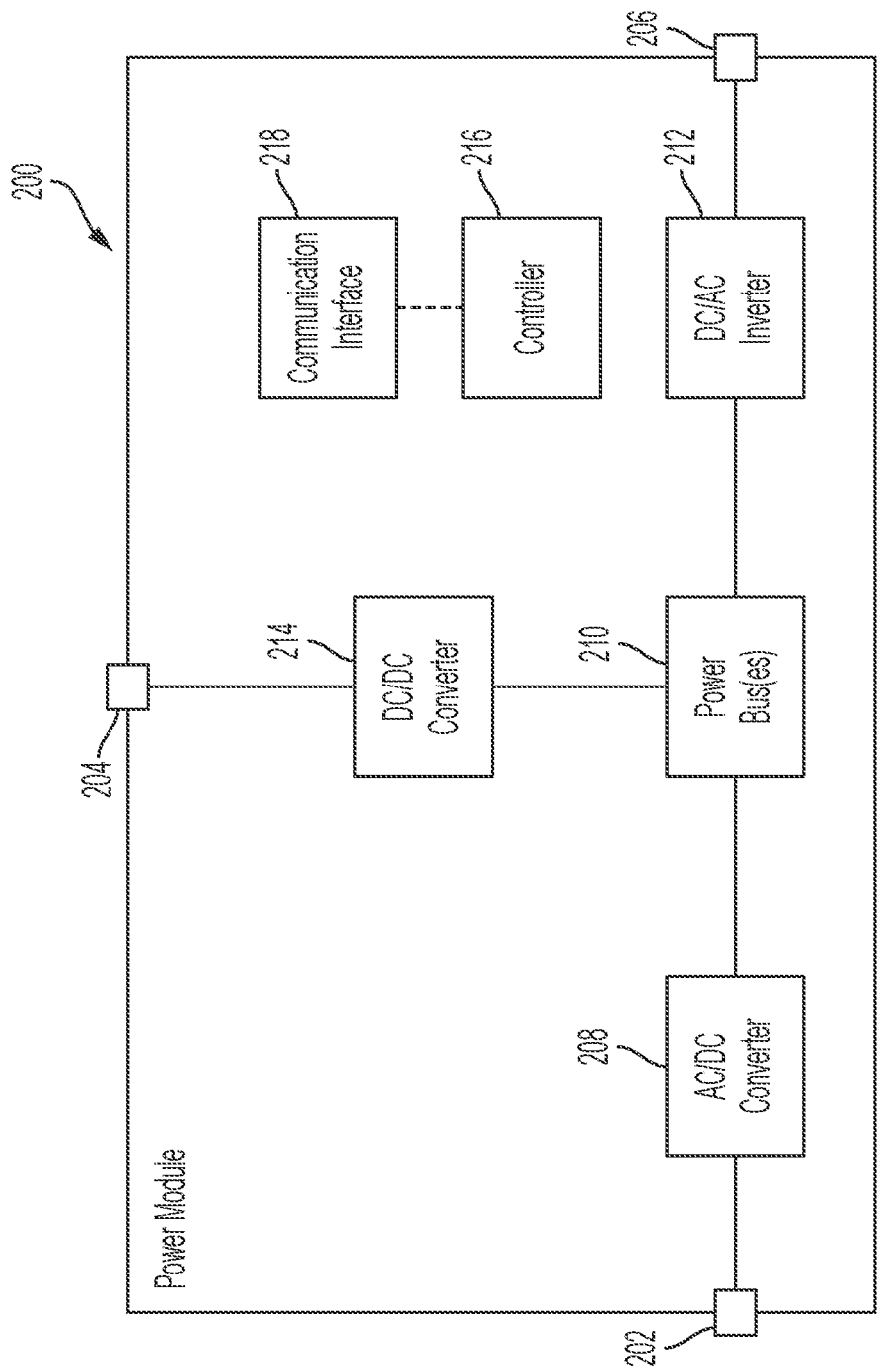
FIG. 2 illustrates a block diagram of a power module according to an example.

FIG. 2 illustrates a block diagram of a power module 200 according to an example. As discussed above, the power module 200 is an example of the power modules of one of or both of the first group of power modules 106 and/or the second group of power modules 108. The power module includes a first input 202, a second input 204, an output 206 (also referred to as output connection 206), an AC/DC converter 208, one or more power busses 210 ("power bus 210"), a DC/AC inverter 212, a DC/DC converter 214, one or more module controllers 216 ("module controller 216"), and at least one communication interface 218 ("communication interface 218").

The first input 202 is coupled to the AC/DC converter 208 and is configured to be coupled to at least one main-power source, such as the grid 114. The second input 204 is coupled to the DC/DC converter 214 and is configured to be coupled to at least one backup power source, such as the backup power source 116. The output 206 is coupled to the DC/AC inverter 212 and is configured to be coupled to at least one of a main-power source or one or more loads 118. For example, where the power module 200 is implemented as an example of one of the first group of power modules 106, the output 206 may be configured to be coupled to the loads 118. In an example in which the power module 200 is implemented as an example of one of the second group of power modules 108, the output 206 may be configured to be coupled to the grid 114.

The AC/DC converter 208 is coupled to the first input 202 at a first connection (for example, an AC-power connection) and is coupled to the power bus 210 at a second connection (for example, a DC-power connection). The AC/DC converter 208 may further be communicatively coupled to the module controller 216. The power bus 210 is coupled to the AC/DC converter 208 at a first connection, the DC/AC inverter 212 at a second connection, and the DC/DC converter 214 at a third connection. The DC/AC inverter 212 is coupled to the power bus 210 at a first connection (for example, a DC-power connection) and to the output connection 206 at a second connection (for example, an AC-power connection). The DC/AC inverter 212 may further be communicatively coupled to the module controller 216. The DC/DC converter 214 is coupled to the second input 204 at a first connection and to the power bus 210 at a second connection. The DC/DC converter 214 may further be communicatively coupled to the module controller 216.

The module controller 216 is communicatively coupled to the AC/DC converter 208, the DC/AC inverter 212, the DC/DC converter 214, and the communication interface 218. The communication interface 218 is communicatively coupled to the module controller 216 and may be configured to be communicatively coupled to the system controller 110 and/or the grid controller 112. For example, the communication interface 218 may include one or more wired- or wireless-communication ports or interfaces to exchange information with one or more entities including, for example, the system controller 110 and/or the grid controller 112.

The module controller 216 may be configured to provide one or more control signals to the AC/DC converter 208, the DC/AC inverter 212, and/or the DC/DC converter 214 to control operation of the components 208, 210, 212, 214. For example, each of the components 208, 210, 212, 214 may include one or more switching devices (for example, MOSFETs, IGBTs, BJTs, relays, and so forth). The module controller 216 may provide one or more control signals to the components 208, 210, 212, 214 to control a switching state of each of the one or more switching devices.

For example, the module controller 216 may control the AC/DC converter 208 to receive an AC power signal from the first input 202, convert the AC power signal to a DC power signal, and provide the DC power signal to the DC/AC inverter 212 and/or the DC/DC converter 214 via the power bus 210.

The module controller 216 may control the DC/AC inverter 212 to draw DC power from the power bus 210, convert the DC power to AC power, and provide the AC power to the output 206. In some examples, the module controller 216 may further control the DC/AC inverter 212 to draw AC power from the output 206, convert the AC power to DC power, and provide the DC power to the AC/DC converter 208 and/or the DC/DC converter 214 via the power bus 210. For example, the module controller 216 may control the DC/AC inverter 212 to draw AC power from the loads 118 via the output 206 in the regenerative mode of operation as discussed in greater detail below. Accordingly, no limitation as to power-conversion directionality is implied by use of the example term "inverter."

The module controller 216 may control the DC/DC converter 214 to draw DC power from the second input 204 (for example, from the backup power source 116 via the second input 204), convert the DC power to converted DC power, and provide the converted DC power to the DC/AC inverter 212 via the power bus 210. The module controller 216 may alternately or additionally control the DC/DC converter 214 to draw DC power from the power bus 210, convert the DC power to converted DC power, and provide the converted DC power to the second input 204. For example, the DC/DC converter 214 may provide the converted DC power to the backup power source 116 via the second input 204 to charge the backup power source 116. Accordingly, no limitation is implied by use of the example term "input."

In some examples, the module controller 216 may also be communicatively coupled to one or more sensors capable of providing information indicative of operational parameters, such as voltage and/or current levels, temperature, or other appropriate information. Although in some examples the module controller 216 may be communicatively coupled to one or more external devices via the communication interface 218, in other examples the communication interface 218 may include the module controller 216 or vice versa. In some examples, the module controller 216 may control the operation of the power module 200 based on one or more received signals, such as operation mode signals received from the system controller 110 and/or requests from the grid controller 112.

The power module 200 may receive power at one or more of the first input 202, second input 204, and output connection 206 and may provide power at the second input 204 and/or the output connection 206. In some examples, the power module 200 may not be configured to output power at the first input 202. For example, the AC/DC converter 208 may be a unidirectional converter configured to draw power from, but not provide power to, the first input 202. In other examples, the AC/DC converter 208 may be bidirectional, and the power module 200 may output power at the first input 202.

In some examples, the power module 200 receives AC power at the first input 202. The AC/DC converter 208 may draw the AC power from the first input 202, convert the AC power into DC power, and provide the DC power to the power bus 210. The DC/AC inverter 212 and/or the DC/DC converter 214 may draw the DC power from the power bus 210. The DC/DC converter 214 may convert the DC power drawn from the power bus 210 into converted DC power, and provide the converted DC power to the second input 204. The DC/AC inverter 212 may convert the DC power drawn from the power bus 210 into AC power, and provide the AC power to the output connection 206.

In some examples, the power module 200 may alternately or additionally provide AC power derived from DC power drawn from the second input 204 to the output connection 206. For example, the second input 204 may receive DC power at the second input 204 (for example, from the backup power source 116). The DC/DC converter 214 may draw the DC power from the second input 204, convert the drawn DC power into converted DC power, and provide the converted DC power to the power busses 210. The DC/AC inverter 212 may draw the converted DC power from the power busses 210, convert the converted DC power to AC power, and provide the AC power to the output connection 206 (for example, to the loads 118).

In some examples, the power module 200 may alternately or additionally provide DC power derived from AC power drawn from the output connection 206 to the second input 204. For example, the output connection 206 may receive AC power (for example, from the loads 118). The DC/AC inverter 212 may draw the AC power from the output connection 206, convert the drawn AC power into DC power, and provide the DC power to the power busses 210. The DC/DC converter 214 may draw the DC power from the power busses 210, convert the drawn DC power to converted DC power, and provide the DC power to the second input 204 (for example, to the backup power source 116).

As discussed above, operation of the power module 200 may depend at least in part on an entity to which the output connection 206 is coupled. In a first configuration, the output connection 206 may be coupled to the loads 118. In the first configuration, the power module 200 may be grouped within the first group of power modules 106 at least in part because the output connection 206 is coupled to the loads 118. The power module 200 of the first configuration may be configured to provide output power to the loads 118 via the output connection 206. In a second configuration, the output connection 206 may be coupled to the grid 114. In the second configuration, the power module 200 may be grouped within the second group of power modules 108 at least in part because the output connection 206 is coupled to the grid 114. The power module 200 of the second configuration may be configured to provide output power to the grid 114 via the output connection 206.

A user may configure the power module 200 before and/or after setup of the UPS system 102. For example, to configure the power module 200 in the first configuration, the user may couple a power connector from the output connection 206 to the loads 118. To configure the power module 200 in the second configuration, the user may couple a power connector from the output connection 206 to the grid 114.

Figure 3:
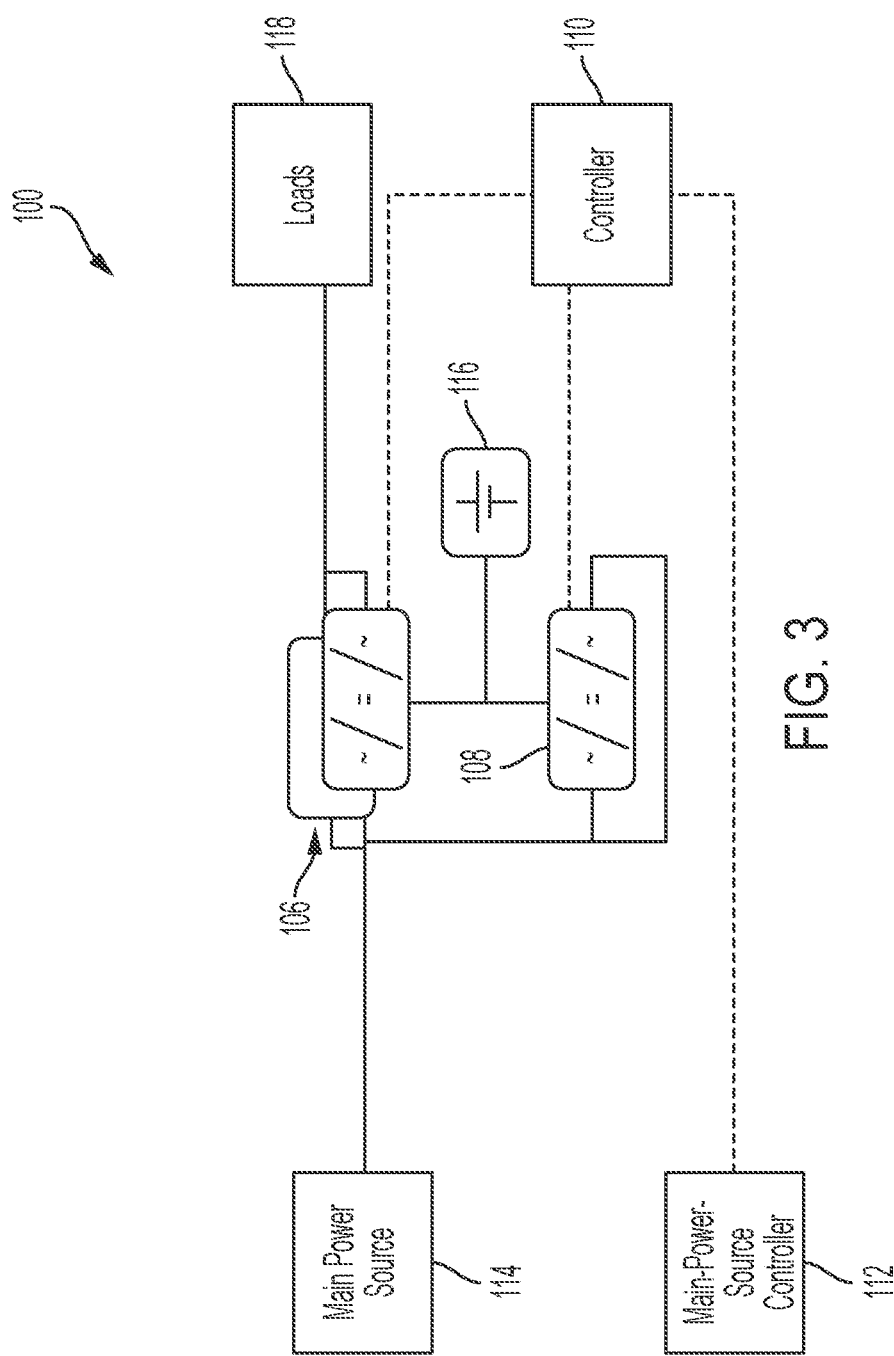
FIG. 3 illustrates a schematic diagram of the power system according to an example.

FIG. 3 illustrates a schematic diagram of the power system 100 according to an example. As discussed above, the power system 100 includes the first group of power modules 106 and the second group of power modules 108. The first group of power modules 106 is in the first configuration, as indicated by the output connection 206 of each power module of the first group of power modules 106 being coupled to the loads 118. The second group of power modules 108 is in the second configuration, as indicated by the output connection 206 of each power module of the second group of power modules 108 being coupled to the grid 114.

The system controller 110 may receive signals from the grid controller 112 indicative of a request for the UPS system 102 to provide grid services to the grid 114. These services may include frequency-containment services, fast frequency response (FFR) services, power services, voltage-support services, ramping and balancing services, and other reliability services for power systems and power grids. The system controller 110 may alter the UPS system's 102 mode of operation based on the requests from the grid controller 112. The system controller 110 may also be communicatively coupled to sensors (not shown) which allow it to determine the voltage, current, temperature, power level, and/or other operating parameters and conditions within the UPS system. The system controller 110 may be communicatively coupled to memory and display interfaces (not shown), and/or to the module controllers 216 of the plurality of power modules 104. The module controllers 216 may also be communicatively coupled to each other.

As discussed above, the system controller 110 may control operation of the plurality of power modules 104. In one example, the system controller 110 may instruct a respective module controller 216 to control operation of a respective power module 200. In other examples, the system controller 110 may control components of the power module 200 directly. An example of controlling operation of the plurality of power modules 104 is provided with respect to FIG. 4.

Figure 4:
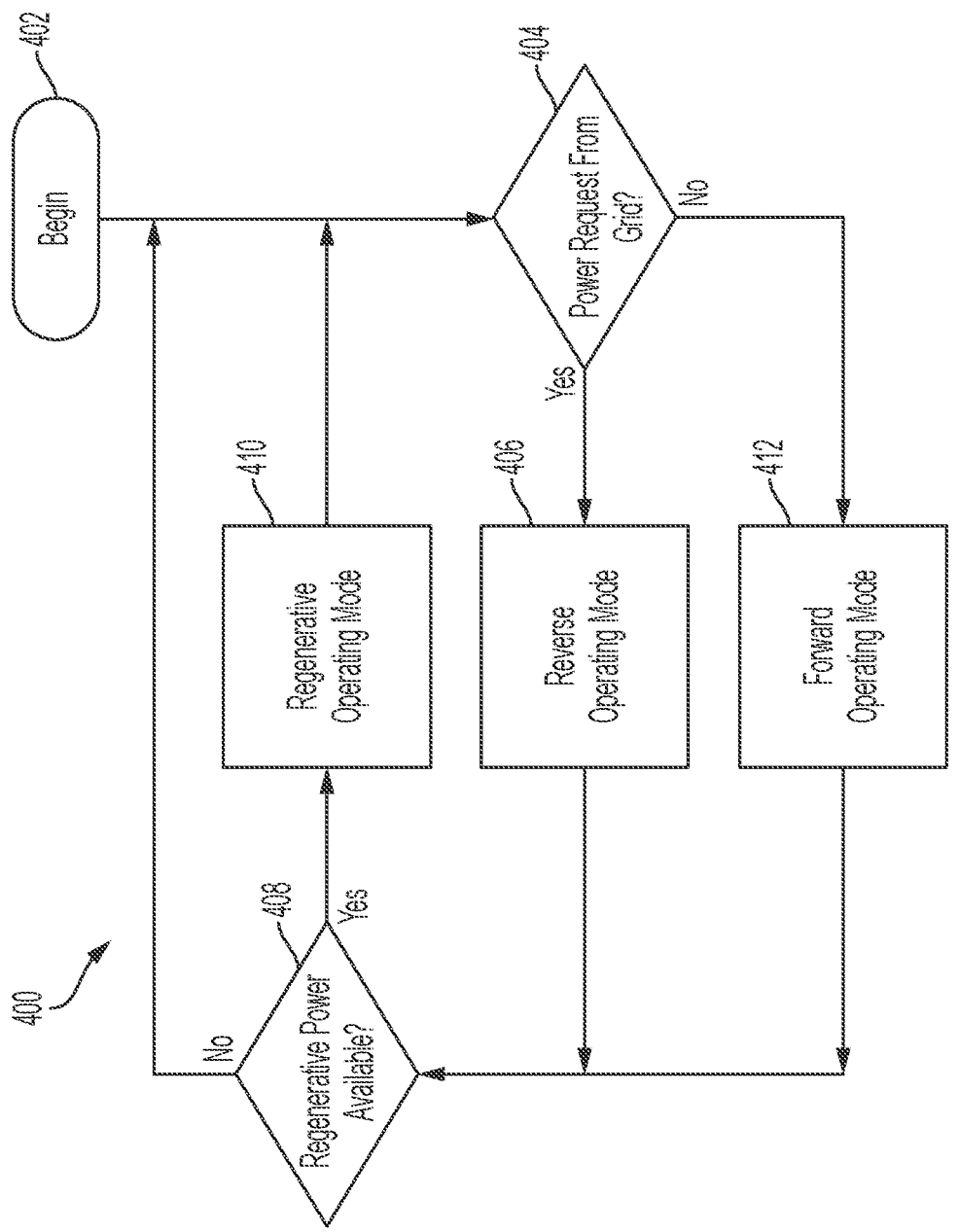
FIG. 4 illustrates a process of operating an uninterruptible power supply system according to an example.

FIG. 4 illustrates a process 400 of operating the UPS system 102 according to an example. In various examples, the process 400 may be executed by the system controller 110 individually or in combination with one or more additional components or devices, such as at least one module controller 216 of one or more power modules of the plurality of power modules 104. For purposes of explanation, examples are provided in which the system controller 110 executes one or more acts of the process 400, however the process 400 may also be executed by the module controllers 216 individually and/or in tandem with one another, and/or individually and/or in tandem with the system controller 110.

At act 402, the process 400 begins. In some examples, the UPS system 102 may be operating in some mode of operation prior to the process 400 beginning at act 402. In other examples, the process 400 may begin when the UPS system 102 is initially powered up. In various examples, the process 400 may be executed continuously and repeatedly while the UPS system 102 is in operation (for example, powered up).

At act 404, the system controller 110 determines whether a request for power has been received from the grid controller 112. For example, the grid controller 112 may request frequency-containment services from the UPS system 102.

The grid controller 112 may request power from the UPS system 102 to correct an imbalance between power supply available to the grid 114 and power demand from the grid 114, for example. In other examples, the grid controller 112 may request power for additional or different reasons, such as to correct a deviation in frequency, or to improve a power factor of power on the grid 114. If the system controller 110 determines that a request for power has been received from the grid controller 112 (404 YES), then the process 400 continues to act 406.

At act 406, the system controller 110 controls the plurality of power modules 104 to operate in a reverse operating mode. For example, in the reverse operating mode, the system controller 110 may control the first group of power modules 106 to provide power derived from the backup power source 116 to the loads 118 and may control the second group of power modules 108 to provide power derived from the backup power source 116 to the grid 114. An example of the reverse operating mode if provided with respect to FIG. 5.

Figure 5:
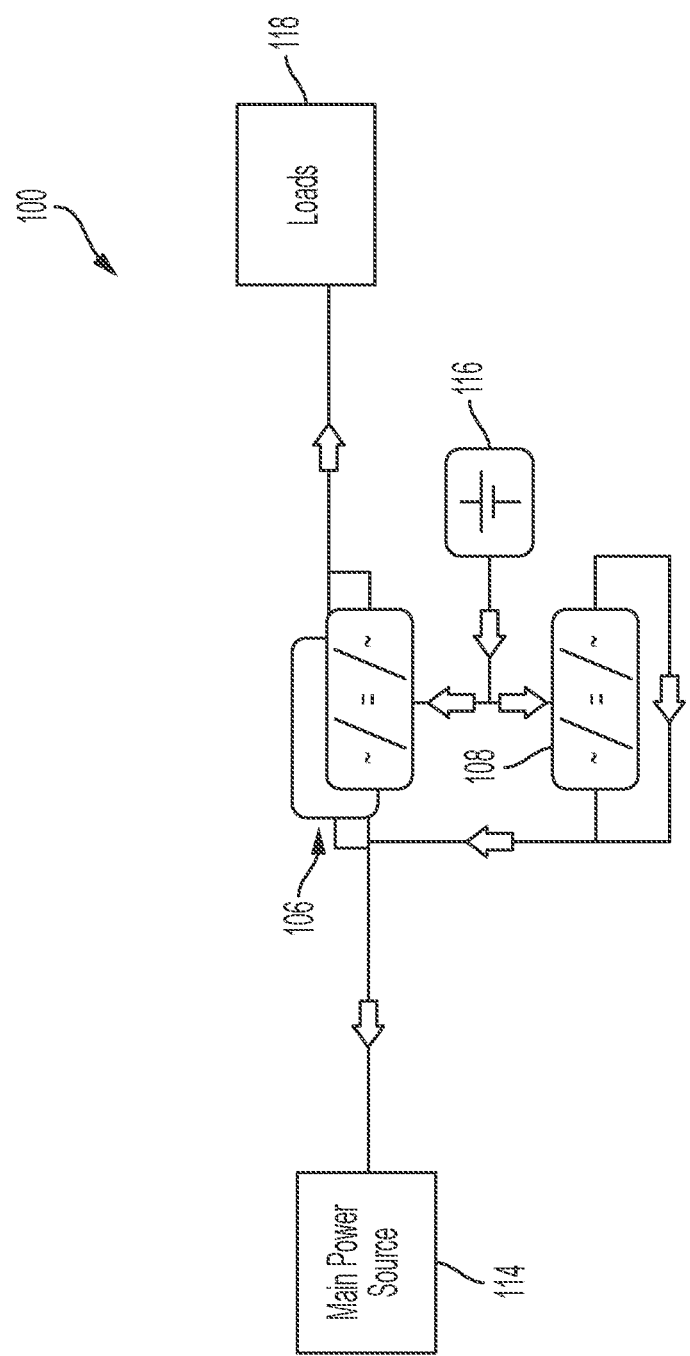
FIG. 5 illustrates a schematic diagram of the power system in a reverse operating mode according to an example.

FIG. 5 illustrates a schematic diagram of the power system 100 in the reverse operating mode according to an example. Arrows may indicate a direction of power in the power system 100 during at least one instant in time during the reverse operating mode. The system controller 110 may control the first group of power modules 106 to draw DC power from the backup power source 116, convert the DC power to AC power, and provide the AC power to the loads 118.

For example, where the power module 200 provides an example of one of the power modules of the first group of power modules 106, the system controller 110 may control (either directly or via the module controller 216) the DC/DC converter 214 to draw DC power from the backup power source 116 via the second input 204, convert the drawn DC power to converted DC power, and provide the converted DC power to the DC/AC inverter 212 via the power busses 210, and control the DC/AC inverter 212 to draw the DC power from the power busses 210, convert the DC power to AC power, and provide the AC power to the loads 118 via the output connection 206.

The system controller 110 may also control the second group of power modules 108 to draw DC power from the backup power source 116, convert the DC power to AC power, and provide the AC power to the grid 114. For example, where the power module 200 provides an example of one of the power modules of the second group of power modules 108, the system controller 110 may control (either directly or via the controller 216) the DC/DC converter 214 to draw DC power from the backup power source 116 via the second input 204, convert the drawn DC power to converted DC power, and provide the converted DC power to the DC/AC inverter 212 via the power busses 210, and control the DC/AC inverter 212 to draw the DC power from the power busses 210, convert the DC power to AC power, and provide the AC power to the grid 114 via the output connection 206.

It will be appreciated that when the UPS system 102 utilizes power as described above, the UPS system 102 may provide a majority of the power available to the UPS system 102 to the loads 118, the backup power source 116, and/or the grid 114 as described above with respect to the mode of operation of the UPS system 102. However, in some examples, some power may be provided to elements of the UPS system 102, such as the module controllers 216, the system controller 110, the communication interface 218, or any other elements of UPS system 102 that require power to operate. In some examples, the power provided to these other elements of the UPS system 102 may be small compared to the power provided to the loads 118, the backup power source 116, and/or the grid 114.

The process 400 then proceeds to act 408. At act 408, the system controller 110 determines whether the UPS system 102 is receiving regenerative or backfeed power from the loads 118. In various examples, the loads 118 may include one or more regenerative loads configured to provide regenerative power to the UPS system 102. For example, the loads 118 may provide the regenerative power to the first group of power modules 106. Each power module of the first group of power modules 106 may receive power at a respective output 206. The system controller 110 may determine that the UPS system 102 is receiving regenerative power by determining that the first group of power modules 106 are receiving power at the respective outputs 206.

If the system controller 110 determines that the UPS system 102 is not receiving regenerative or backfeed power form the loads 118 (408 NO), then the process 400 returns to act 404. However, if the system controller 110 determines that the UPS system 102 is receiving regenerative or backfeed power from the loads 118 (408 YES), then the process 400 may continue to act 410.

At act 410, the system controller 110 controls the plurality of power modules 104 to operate in a regenerative operating mode. For example, in the regenerative operating mode, the system controller 110 may control the first group of power modules 106 to provide power derived from the loads 118 to the backup power source 116 and/or the second inputs 202 of the second group of power modules 108. In some examples, the system controller 110 may control the first group of power modules 106 to provide the power derived from the loads 118 to the backup power source 116 or, if the backup power source 116 is charged, to the grid 114 via the second group of power modules 108. The system controller 110 may control the second group of power modules 108 to provide power to the grid 114. An example of the regenerative operating mode is provided with respect to FIG. 6.

Figure 6:
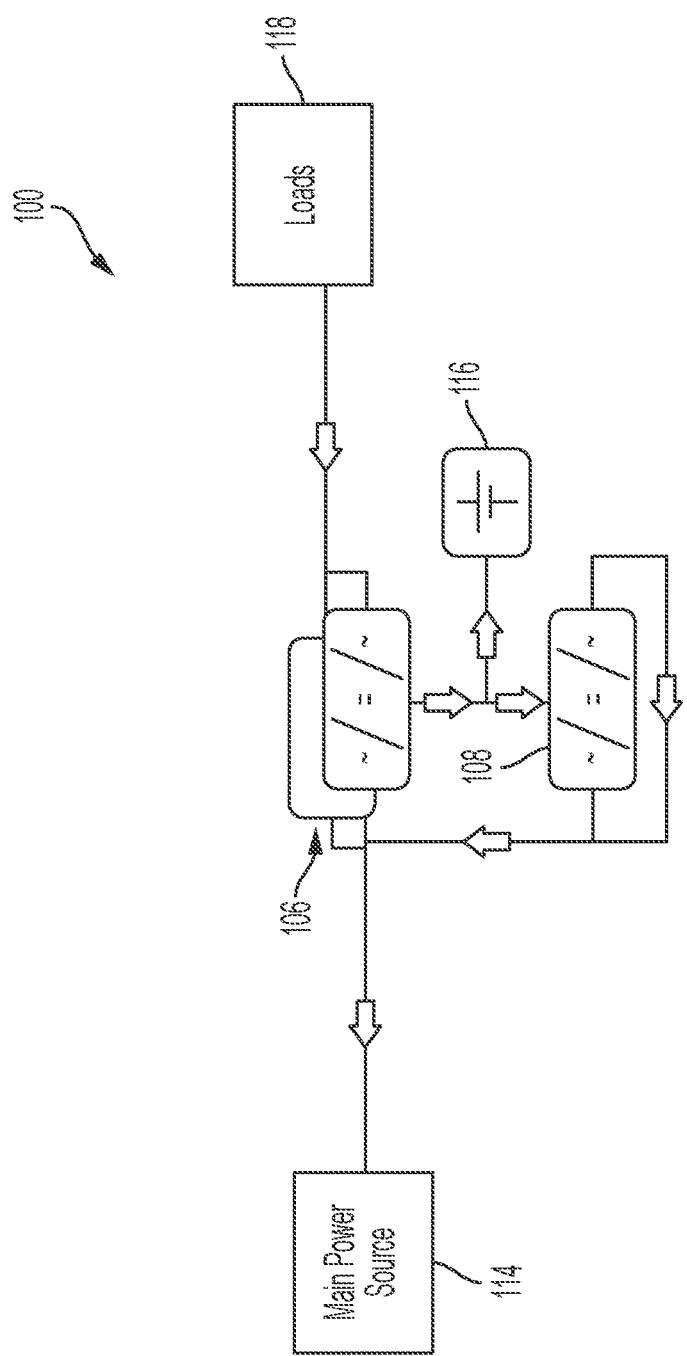
FIG. 6 illustrates a schematic diagram of the power system in a regenerative operating mode according to an example.

FIG. 6 illustrates a schematic diagram of the power system 100 in the regenerative operating mode according to an example. Arrows may indicate a direction of power in the power system 100 during at least one instant in time during the regenerative operating mode. However, power may be provided in one or more additional or different directions at different points in time of the regenerative operating mode. The system controller 110 may control the first group of power modules 106 to draw AC power from the loads 118, convert the AC power to DC power, and provide the DC power to the backup power source 116 and/or the second group of power modules 108.

For example, where the power module 200 provides an example of one of the power modules of the first group of power modules 106, the system controller 110 may control (either directly or via the module controller 216) the DC/AC inverter 212 to draw AC power from the loads 118 via the output 206, convert the drawn AC power to converted DC power, and provide the converted DC power to the DC/DC converter 214 via the power busses 210. The DC/DC converter 214 may provide the DC power to the backup power source 116 and/or the second group of power modules 108 via the output connections 206 of the first group of power modules 106.

In one example, the system controller 110 may control (either directly or via the module controller 216) the one or more power modules of the first group of power modules 106 to provide, via the DC/DC converter 214, power to the backup power source 116. For example, the first group of power modules 106 may provide power to the backup power source 116 if the backup power source 116 is not fully charged. In some examples, the system controller 110 may control (either directly or via the module controller 216) the one or more power modules of the first group of power modules 106 to provide, via the DC/DC converter 214, power to the grid 114 via the second group of power modules 108 in addition to, or in lieu of, providing power to the backup power source 116. For example, the first group of power modules 106 may provide the power to the second group of power modules 108 if the backup power source 116 is fully charged (or charged above a threshold amount), and the second group of power modules 108 may provide the power to the grid 114.

In examples in which the second group of power modules 108 provide power to the grid 114, the system controller 110 may also control the second group of power modules 108 to draw DC power from the backup power source 116 and/or from the first group of power modules 106, convert the DC power to AC power, and provide the AC power to the grid 114. For example, where the power module 200 provides an example of one of the power modules of the second group of power modules 108, the system controller 110 may control (either directly or via the controller 216) the DC/DC converter 214 to draw DC power from the backup power source 116 and/or the first group of power modules 106 via the second inputs 204 of the second group of power modules 108, convert the drawn DC power to converted DC power, and provide the converted DC power to the DC/AC inverter 212 via the power busses 210, and control the DC/AC inverter 212 to draw the DC power from the power busses 210, convert the DC power to AC power, and provide the AC power to the grid 114 via the output connection 206.

It will be appreciated that when the UPS system 102 utilizes power as described above, the UPS system 102 may provide a majority of the power available to the system to the loads 118, backup power source 116, and/or grid 114 as described above with respect to the UPS system's 102 mode of operation. However, in some examples, some power may be provided to elements of the UPS system 102, such as the module controllers 216, the system controller 110, the communication interface 218, or any other elements of UPS system 102 that require power to operate. In some examples, the power provided to these other elements of the UPS system 102 may be small compared to the power provided to the loads 118, the backup power source 116, and/or the grid 114.

The process 400 then returns to act 404. If the system controller 110 determines that no request for power has been received from the grid controller (404 NO), then the process 400 continues to act 412.

At act 412, the system controller 110 controls the plurality of power modules 104 to operate in a forward operating mode. For example, in the forward operating mode, the system controller 110 may control the first group of power modules 106 to provide power derived from the grid 114 to the backup power source 116 and/or the loads 118. The system controller 110 may control the second group of power modules 108 to provide power to the backup power source 116. An example of the forward operating mode is provided with respect to FIG. 7.

Figure 7:
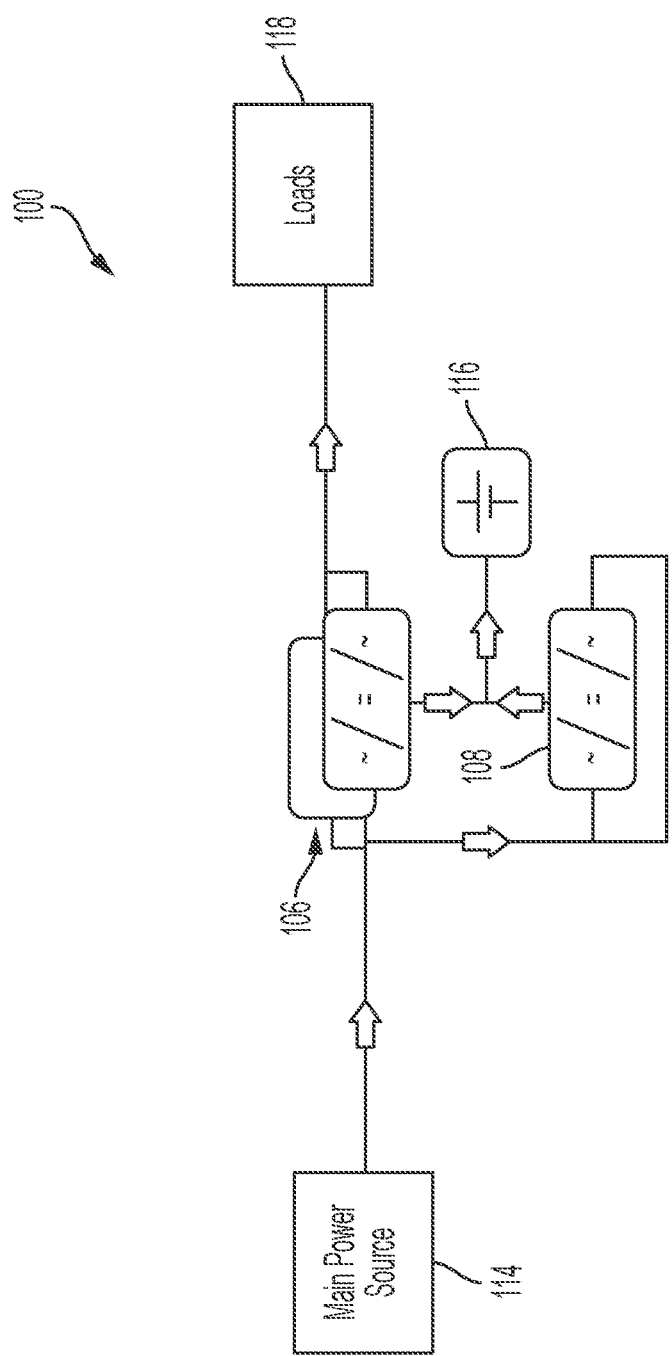
FIG. 7 illustrates a schematic diagram of the power system in a forward operating mode according to an example.

FIG. 7 illustrates a schematic diagram of the power system 100 in the forward operating mode according to an example. Arrows may indicate a direction of power in the power system 100 during at least one instant in time during the forward operating mode. The system controller 110 may control the first group of power modules 106 to draw AC power from the grid 114, convert the AC power to DC power, and provide the DC power to the backup power source 116 and/or the loads 118.

For example, where the power module 200 provides an example of one of the power modules of the first group of power modules 106, the system controller 110 may control (either directly or via the module controller 216) the AC/DC converter 208 to draw AC power from the grid 114 via the first input 202, convert the drawn AC power to converted DC power, and provide the converted DC power to the DC/DC converter 214 via the power busses 210, and provide the DC power to the backup power source 116 and/or the loads 118.

The system controller 110 may also control the second group of power modules 108 to draw AC power from the grid 114, convert the AC power to DC power, and provide the DC power to the backup power source 116. For example, where the power module 200 provides an example of one of the power modules of the second group of power modules 108, the system controller 110 may control (either directly or via the controller 216) the AC/DC converter 208 to draw AC power from the grid 114 first inputs 202 of the second group of power modules 108, convert the drawn AC power to converted DC power, and provide the converted DC power to the DC/DC converter 214 via the power busses 210, and control the DC/DC converter 214 to draw the DC power from the power busses 210, and provide the DC power to the backup power source 116 via the second input 204.

It will be appreciated that when the UPS system 102 utilizes power as described above, the UPS system 102 may provide a majority of the power available to the system to the loads 118, backup power source 116, and/or grid 114 as described above with respect to the UPS system's 102 mode of operation. However, in some examples, some power may be provided to elements of the UPS system 102, such as the module controllers 216, the system controller 110, the communication interface 218, or any other elements of UPS system 102 that require power to operate. In some examples, the power provided to these other elements of the UPS system 102 may be small compared to the power provided to the loads 118, the backup power source 116, and/or the grid 114.

The process 400 then continues to act 408. As discussed above, at act 408 the system controller 110 determines whether the UPS system 102 is receiving regenerative or backfeed power from the loads 118. If the system controller 110 determines that regenerative or backfeed power is available (408 YES), then the process 400 continues to act 410. Otherwise, if the system controller 110 determines that regenerative or backfeed power is not available (408 NO), then the process 400 returns to act 404. The process 400 may be repeatedly executed to select a mode of operation for the UPS system 102.

It should be appreciated that these acts of the process 400 are purely illustrative and may occur in various orders or even simultaneously. For example, a determination as to whether a request to provide power to the grid 114 has been received (as discussed above with respect to act 404) and a determination as to whether regenerative (backfeed) power is available (as discussed above with respect to act 408) may be executed in parallel (and, in some examples, substantially simultaneously) in various examples. In various examples, determining a request to provide power to the grid 114 (as discussed above with respect to act 404) may include one or more signals and may contain various types of information, such as control information directly instructing the UPS system 102 to operate in a particular operation mode and/or other information which may prompt the system to switch between operating modes. Furthermore, the modes may be executed concurrently or sequentially with each other.

In some examples, the UPS system 102 may be configured to operate in the regenerative operating mode (as discussed above with respect to acts 408 and 410) for so long as regenerative power is available, and may provide the regenerative power (or power derived therefrom) to the grid 114 and/or the backup power source 116. The UPS system 102 may then operate in a different operating mode, such as an operating mode that the UPS system 102 was in prior to entering regenerative operating mode, such as the reverse or forward operating modes. In some examples, act 408 may be executed before and/or in parallel with one or more acts of the process 400, such as acts 404, 406, 410 and/or 412. Other acts in process 400 may also be executed in a different order.

In some cases, the system controller 110 controls the operation modes of the power modules and changes between the modes of operation. In other cases, the module controllers 216 may control the operation mode of their respective power modules 200 and change between the modes of operation. In some cases, the system controller 110 and module controllers 216 may control the operation mode and changes between the operation modes of the power modules 200 together or in a distributed manner. For example, each of the converters 208, 212, 214 may include one or more switches. These switches may be of any appropriate type, such as transistor-based switches or relays. In some examples, the system controller 110 directly controls the operation of the switches. In other examples, the system controller 110 controls the module controllers 216, and the module controllers 216 in turn control the switches. In other examples, the system controller 110 and module controllers 216 may both control the switches in tandem, in a distributed manner, and/or independently of each other.

It will also be appreciated that the operating modes described in FIGS. 5-7 may not necessarily constitute all the operating modes that the UPS system 102 may operate in. Other modes may exist.

It will also be appreciated that, in some examples, during the operating modes described above, power provided to the loads 118 may be provided as voltage-controlled power and power provided to the grid 114 may be provided as current-controlled power. In other examples, the power provided to the loads 118, grid 114, and/or backup power source 116 may be controlled according to one or more parameters, such as voltage, current, temperature, wattage, and so forth.

In some examples, the ratio of power modules in the first group of power modules 106 to the power modules in the second group of power modules 108 may not be one-to-one. For example, there may be more or fewer power modules in the first group of power modules 106 compared to in the second group of power modules 108. In other examples, the first group of power modules 106 may include the same number of power modules as the second group of power modules 108.

In some examples, one or more power modules of the plurality of power modules 104 may be modular. Accordingly, power modules may be added to or removed from the UPS system 102 and/or may be moved between the groups of power modules 106, 108 as desired. For example, a power module may be moved from the first group of power modules 106 to the second group of power modules 108. The power module may be moved from the first group of power modules 106 to the second group of power modules 108, for example, disconnecting the module output 206 from the loads 118 and connecting the module output 206 to the grid 114.

In some examples, the system controller 110 may be configured to control a mode of operation of each power module of the plurality of power modules 104, as discussed above. However, in various examples, each power module of the plurality of power modules 104 may be configured to control the mode of operation in which the respective power module operates. For example, the module controller 216 may detect certain parameters, such as input and/or output voltage levels, input and/or output current levels, temperatures, or other parameters, and operate the power module 200 based on the parameters.

Various controllers, such as the system controller 110, grid controller 112, and/or module controller 216, may execute various operations discussed above. One or more of the controllers 110, 112, 216 may be communicatively coupled to data storage devices, such as hard drives or solid state drives or other forms of computer memory. Using data stored in associated memory and/or storage, any of the controllers 110, 112, 216 may, respectively, execute one or more instructions stored on one or more respective non-transitory computer-readable media, which the respective controller may include and/or be coupled to, which may result in manipulated data. In some examples, one or more of the controllers 110, 112, 216 may include one or more processors or other types of controllers. In one example, the system controller 110 and/or module controller 216 is or includes at least one processor. In another example, the controllers 110, 112, 216 may perform at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply (UPS) system comprising:
 a first input configured to be coupled to a main-power source;
 a second input configured to be coupled to a backup-power source;
 an output configured to be coupled to at least one load;
 a first group of one or more power modules coupled to the first input, the second input, and the output;
 a second group of one or more power modules coupled to the first input and the second input; and
 at least one controller configured to
  control, in a reverse mode of operation, the first group of one or more power modules to provide power derived from the second input to the output, wherein a majority of power provided by each power module of the first group of one or more power modules in the reverse mode of operation is provided to the output, control, in the reverse mode of operation, the second group of one or more power modules to provide power derived from the second input to the first input, wherein a majority of power provided by each power module of the second group of one or more power modules in the reverse mode of operation is provided to the first input, control, in a forward mode of operation, the first group of one or more power modules to provide power derived from the first input to the output and to provide power derived from the first input to the second input, wherein a majority of power provided by the first group of one or more power modules in the forward mode of operation is provided to the output and the second input, and control, in the forward mode of operation, the second group of one or more power modules to provide power derived from the first input to the second input, wherein a majority of power provided by the second group of one or more power modules in the forward mode of operation is provided to the second input.

2. The UPS of claim 1 wherein the at least one controller is further configured to receive, from a grid controller coupled to the main-power source, a request for power, and control, responsive to receiving the request for power, the UPS system to operate in the reverse mode of operation.

3. The UPS system of claim 1, wherein the at least one controller is further configured to control, in a regenerative mode of operation, the first group of one or more power modules to provide power derived from the output to the second input.

4. The UPS system of claim 3, wherein the at least one controller is further configured to control, in the regenerative mode of operation, the second group of one or more power modules to provide power derived from the second input to the first input.

5. The UPS system of claim 1, wherein the at least one controller is further configured to control the second group of one or more power modules to provide a current-controlled power output to the first input.

6. The UPS system of claim 5, wherein the at least one controller is further configured to provide one or more pulse-width-modulation signals to the second group of one or more power modules to provide the current-controlled power output to the first input.

7. The UPS system of claim 1, wherein the at least one controller is further configured to control the first group of one or more power modules to provide a voltage-controlled power output to the output.

8. The UPS system of claim 1, wherein the majority of the power provided by each power module of the first group of one or more power modules in the forward mode of operation is at least ninety percent of the power provided by each power module of the first group of one or more power modules in the forward mode of operation, and wherein the majority of power provided by each power module of the second group of one or more power modules in the forward mode of operation is at least ninety percent of the power provided by each power module of the second group of one or more power modules in the forward mode of operation.

9. A non-transitory computer-readable medium storing thereon sequences of computer-executable instructions for controlling an uninterruptible power supply system having a first input configured to be coupled to a main-power source, a second input configured to be coupled to a backup-power source, an output configured to be coupled to at least one load, a first group of one or more power modules coupled to the first input, the second input, and the output, and a second group of one or more power modules coupled to the first input and the second input, the sequences of computer-executable instructions including instructions that instruct at least one processor to:

control, in a reverse mode of operation, the first group of one or more power modules to provide power derived from the second input to the output, wherein a majority of the power provided by each power module of the first group of one or more power modules in the reverse mode of operation is provided to the output, control, in the reverse mode of operation, the second group of one or more power modules to provide power derived from the second input to the first input, wherein a majority of the power provided by each power module of the second group of one or more power modules in the reverse mode of operation is provided to the first input, control, in a forward mode of operation, the first group of one or more power modules to provide power derived from the first input to the output and the second input, wherein a majority of the power provided by each power module of the first group of one or more power modules in the forward mode of operation is provided to the output and the second input, and control, in the forward mode of operation, the second group of one or more power modules to provide power derived from the first input to the second input, wherein a majority of the power provided by each power module of the second group of one or more power modules in the forward mode of operation is provided to the second input.

10. The non-transitory computer-readable medium of claim 9, wherein the instructions further instruct the at least one processor to receive, from a grid controller coupled to the main-power source, a request for power; and control, responsive to receiving the request for power, the uninterruptible power supply system to operate in the reverse mode of operation.

11. The non-transitory computer-readable medium of claim 9, wherein the instructions further instruct the at least one processor to control, in a regenerative mode of operation, the first group of one or more power modules to provide power derived from the output to the second input.

12. The non-transitory computer-readable medium of claim 11, wherein the instructions further instruct the at least one processor to control, in the regenerative mode of operation, the second group of one or more power modules to provide power derived from the second input to the first input.

13. The non-transitory computer-readable medium of claim 9, wherein the instructions further instruct the at least one processor to control the first group of one or more power modules to provide a voltage-controlled power output to the output.

14. The non-transitory computer-readable medium of claim 9, wherein the instructions further instruct the at least one processor to control the second group of one or more power modules to provide a current-controlled power output to the first input.

15. The non-transitory computer-readable medium of claim 14, wherein the instructions further instruct the at least one processor to provide one or more pulse-width-modulation signals to the second group of one or more power modules to provide the current-controlled power output to the first input.

16. The non-transitory computer-readable medium of claim 9, wherein the majority of the power provided by each power module of the first group of one or more power modules in the forward mode of operation is at least ninety percent of the power provided by each power module of the first group of one or more power modules in the forward mode of operation, and wherein the majority of power provided by each power module of the second group of one or more power modules in the forward mode of operation is at least ninety percent of the power provided by each power module of the second group of one or more power modules in the forward mode of operation.

17. A method for controlling an uninterruptible power supply system having a first input configured to be coupled to a main-power source, a second input configured to be coupled to a backup-power source, an output configured to be coupled to at least one load, a first group of one or more power modules coupled to the first input, the second input, and the output, and a second group of one or more power modules coupled to the first input and the second input, the method comprising:

controlling, in a forward mode of operation, the first group of one or more power modules to provide power derived from the first input to the output and the second input, wherein a majority of the power provided by each power module of the first group of one or more power modules in the forward mode of operation is provided to the output and the second input;

controlling, in the forward mode of operation, the second group of one or more power modules to provide power derived from the first input to the second input, wherein a majority of the power provided by each power module of the second group of one or more power modules in the forward mode of operation is provided to the second input;

controlling, in a reverse mode of operation, the first group of one or more power modules to provide power derived from the second input to the output, wherein a majority of the power provided by each power module of the first group of one or more power modules in the reverse mode of operation is provided to the output; and controlling, in the reverse mode of operation, the second group of one or more power modules to provide power derived from the second input to the first input, wherein a majority of the power provided by each power module of the second group of one or more power modules in the reverse mode of operation is provided to the first input.

18. The method of claim 17 further comprising:
receiving, from a grid controller coupled to the main-power source, a request for power; and
controlling, responsive to receiving the request for power, the uninterruptible power supply system to operate in the reverse mode of operation.

19. The method of claim 17 further comprising:
controlling, in a regenerative mode of operation, the first group of one or more power modules to provide power derived from the output to the second input.

20. The method of claim 19 wherein, in the regenerative mode of operation, the second group of one or more power modules to provide power derived from the second input to the first input.

* * * * *